US009137434B2

(12) United States Patent
Hu et al.

(10) Patent No.: US 9,137,434 B2
(45) Date of Patent: Sep. 15, 2015

(54) SOUND SOURCE MONITORING SYSTEM AND METHOD THEREOF

(75) Inventors: An-Chi Hu, New Taipei (TW); Yan-Chen Lu, New Taipei (TW)

(73) Assignee: VATICS INC., New Taipei (TW)

(*) Notice: Subject to any disclaimer, the term of this patent is extended or adjusted under 35 U.S.C. 154(b) by 950 days.

(21) Appl. No.: 13/314,914

(22) Filed: Dec. 8, 2011

(65) Prior Publication Data

US 2013/0070104 A1    Mar. 21, 2013

(30) Foreign Application Priority Data

Sep. 16, 2011    (TW) .............................. 100133486 A

(51) Int. Cl.
*H04N 5/232*    (2006.01)
(52) U.S. Cl.
CPC .................................. *H04N 5/232* (2013.01)
(58) Field of Classification Search
CPC ....................................................... H04N 5/232
USPC ......................................................... 348/169
See application file for complete search history.

(56) References Cited

U.S. PATENT DOCUMENTS

| | | | |
|---|---|---|---|
| 6,795,106 | B1 | 9/2004 | Cooper |
| 6,965,541 | B2 | 11/2005 | Lapin et al. |
| 7,002,617 | B1 | 2/2006 | Smith |
| 7,852,369 | B2 | 12/2010 | Cutler et al. |
| 2008/0266394 | A1 | 10/2008 | Groenenboom |
| 2009/0002476 | A1* | 1/2009 | Cutler ......................... 348/14.01 |
| 2010/0150360 | A1* | 6/2010 | Beaucoup ....................... 381/58 |

OTHER PUBLICATIONS

Evangelopoulos et al., "Audio-Visual Attention Modeling and Salient Event Detection", Multimodal Processing and Interaction: Audio, Video, Text, Springer-Verlag (2008), pp. 179-199.
Calmes et al., "Azimuthal Sound Localization Using Coincidence of Timing Across Frequency on a Robotic Platform", J. Acoust. Soc. Am., (Jan. 26, 2007), pp. 2034-2048, vol. 121, No. 4.
Mandel et al., "Em Localization and Separation Using Interaural Level and Phase Cues", IEEE Workshop on Applications of Signal Processing to Audio and Acoustics (Oct. 21-24, 2007), pp. 1-4, New Paltz, NY.
Christensen et al., "Integrating Pitch and Localisation Cues at a Speech Fragment Level", Interspeech (Aug. 27-31, 2007) pp. 2769-2772, Antwerp, Belgium.

(Continued)

*Primary Examiner* — Sath V Perungavoor
*Assistant Examiner* — Jeffery Williams
(74) *Attorney, Agent, or Firm* — Muncy, Geissler, Olds & Lowe, P.C.

(57) ABSTRACT

A sound source monitoring system includes a sound receiving module, a sound detection module, a sound source localization module, and a camera module. The sound receiving module is configured to receive a plurality of sound signals. The sound detection module is for dividing an integrated signal formed by adding the sound signals received by the sound receiving module and normalizing the sum of the sound signals or dividing each of the sound signals into a plurality of sub-bands, calculating a signal-to-noise ratio (SNR) of each sub-band and a background noise, and accordingly determining whether to output the sound signals received by the sound receiving module to the sound source localization module. The sound source localization module is for outputting a sound source location by using the sound signals received by the sound receiving module. The camera module is for shooting an image corresponding to the sound source location.

9 Claims, 11 Drawing Sheets

(56) References Cited

OTHER PUBLICATIONS

Giguére et al., "Sound Localization: Effects of Reverberation Time, Speaker Array, Stimulus Frequency and Stimulus Rise/Decay", J. Acoust. Soc. Am. (Aug. 1, 1993), pp. 769-776, vol. 94, No. 2.

Martin, Rainer—"Spectral Subtraction Based on Minimum Statistics", Proc. EUSIPCO (1994), pp. 1182-1185, vol. 94.

Bian et al., "Using Sound Source Localization in a Home Environment", Pervasive LNCS 3468, (2005), pp. 19-36.

\* cited by examiner

SOUND SOURCE MONITORING SYSTEM AND METHOD THEREOF

CROSS-REFERENCE TO RELATED APPLICATIONS

This non-provisional application claims priority under 35 U.S.C. §119(a) on Patent Application No(s). 100133486 filed in Taiwan, R.O.C. on Sep. 16, 2011, the entire contents of which are hereby incorporated by reference.

BACKGROUND

1. Technical Field

The disclosure relates to a monitoring system and a method thereof, in particular, to a sound source monitoring system and a method thereof.

2. Related Art

Due to the deterioration of public order, monitoring systems or closed-circuit televisions are generally installed in various public or private space such as companies, buildings, shopping malls, and financial mechanisms so as to monitor the specific space or environment and to preserve important things therein or preventing accidents.

With respect to a general monitoring system or a closed-circuit TV, at least one camera is installed in the specific space or environment to be monitored, and image frames obtained by the camera are transmitted to a display screen connected thereto, so that Security may monitor the space or the environment in real time. The monitoring system is capable of analyzing object movement or dynamic image change, thereby correspondingly driving the camera to perform close-up shooting. However, the monitoring system still cannot shoot the occurrence of accidents accurately according to the object movement or dynamic image change.

Therefore, a conventional monitoring system which can estimate the location of a sound source according to the changes of sound signals, and therefore, control and adjust the shooting direction of the camera to the location of the sound is developed. However, the inventors recognize that in a noisy environment, due to the interference of background noise, the conventional monitoring system always cannot correctly estimate the location of the sound source correctly, such as the location of the jumping sound. Accordingly the camera cannot obtain the image of the sound source location correctly.

SUMMARY

According to an embodiment of a sound source monitoring system of the disclosure, the sound source monitoring system comprises a sound receiving module, a sound detection module, a sound source localization module, and a camera module. The sound receiving module comprises multiple sound receiving units, and the sound detection module is coupled to each sound receiving unit in the sound receiving module and the sound source localization module. Each sound receiving unit is configured to receive a sound signal, and the sound detection module is configured to divide an integrated signal or each sound signal into K sub-bands, calculate a signal-to-noise ratio of each sub-band and a background noise, and then determine whether to output the sound signal received by the sound receiving module. K is a positive integer greater than or equal to 2, and the integrated signal is a normalized sum of the sound signals received by the sound receiving module. The sound source localization module receives the sound signals received by the sound receiving module, so as to output a sound source location. The camera module shoots an image corresponding to the sound source location in response to the sound source location.

According to an embodiment of a sound source monitoring method of the disclosure, the sound source monitoring method comprises receiving multiple sound signals. Each sound signal or an integrated signal is divided into K sub-bands, so as to calculate an SNR of each sub-band and a background noise, thereby determining whether to output a multiple sound signals to a sound source localization module. K is a positive integer greater than or equal to 2, and the integrated signal is formed by adding the sound signals and normalizing the sum of the sound signals. When the sound signals are transmitted to the sound source localization module, the sound source localization module receives the sound signals to output a sound source location. When the sound source localization module outputs the sound source location, a camera module is used to shoot an image corresponding to the sound source location in response to the sound source location.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Some embodiments of the disclosure are directed to a sound source monitoring system and a method thereof for solving the problem in the prior art that a source location of sound cannot be estimated correctly due to interference of background noises and therefore a camera cannot shoot an image of the sound source location correctly.

Figure 1:
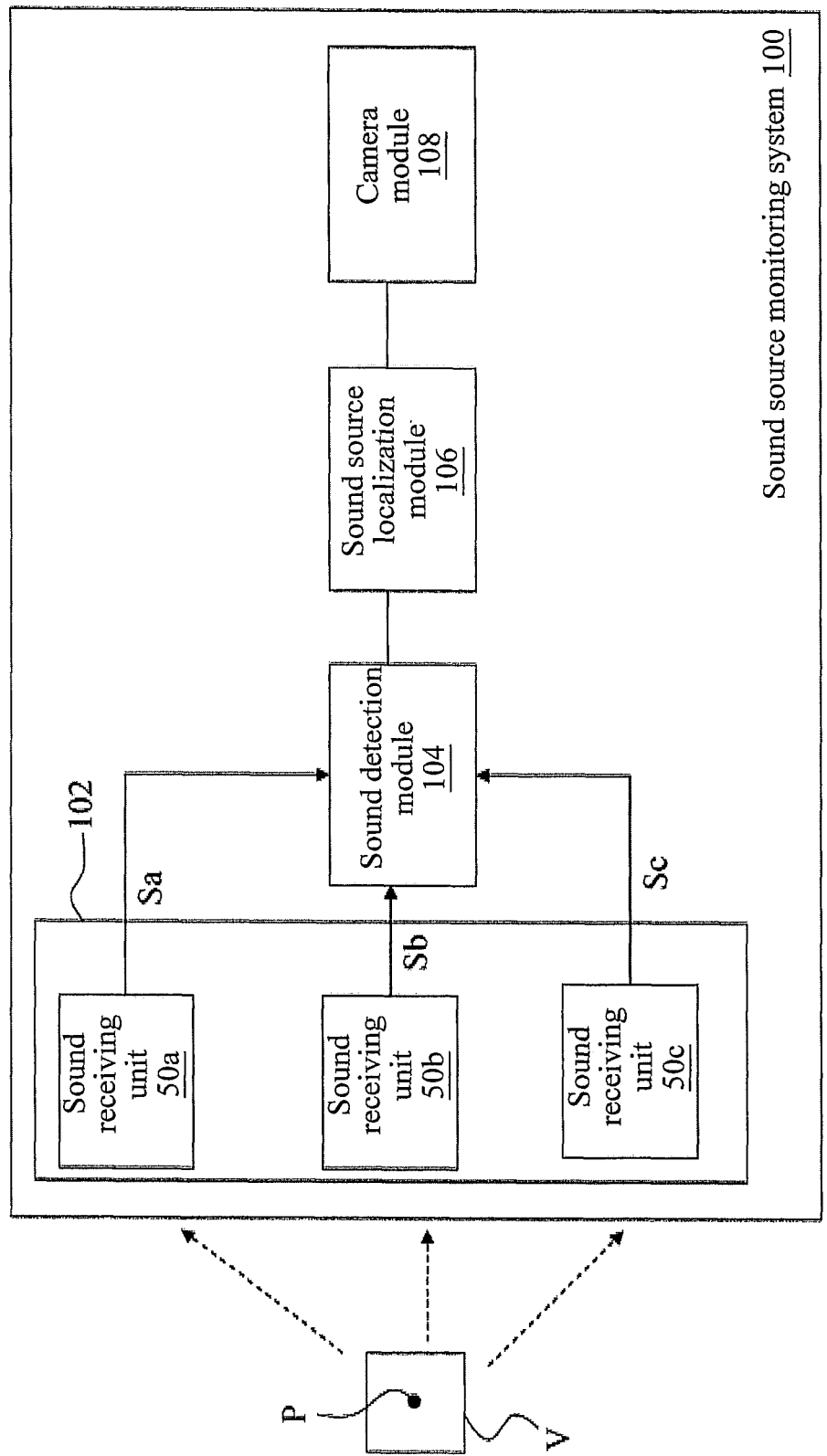
FIG. 1 is a schematic block diagram of an embodiment of a sound source monitoring system according to the disclosure.

Referring to FIG. 1, a schematic block diagram of an embodiment of a sound source monitoring system according to the disclosure is shown. In this embodiment, the sound source monitoring system 100 comprises a sound receiving module 102, a sound detection module 104, a sound source localization module 106, and a camera module 108. The sound receiving module 102 comprises sound receiving units 50a, 50b, 50c, and the sound receiving units 50a, 50b, 50c are respectively used for receiving sound signals Sa, Sb, Sc, but the disclosure is not limited thereto. In some embodiments, the sound receiving module 102 comprise five sound receiving units, and the number of sound signals received by the sound receiving module 102 is also five. The following embodiment is described by taking the sound receiving module 102 comprising three sound receiving units (that is, the sound receiving units 50a, 50b, 50c) as an example, but the disclosure is not limited thereto.

In this embodiment, the sound detection module 104 is coupled to the sound receiving units 50a, 50b, 50c of the sound receiving module 102 and to the sound source localization module 106. The sound source localization module 106 is coupled to the camera module 108.

Figure 2:
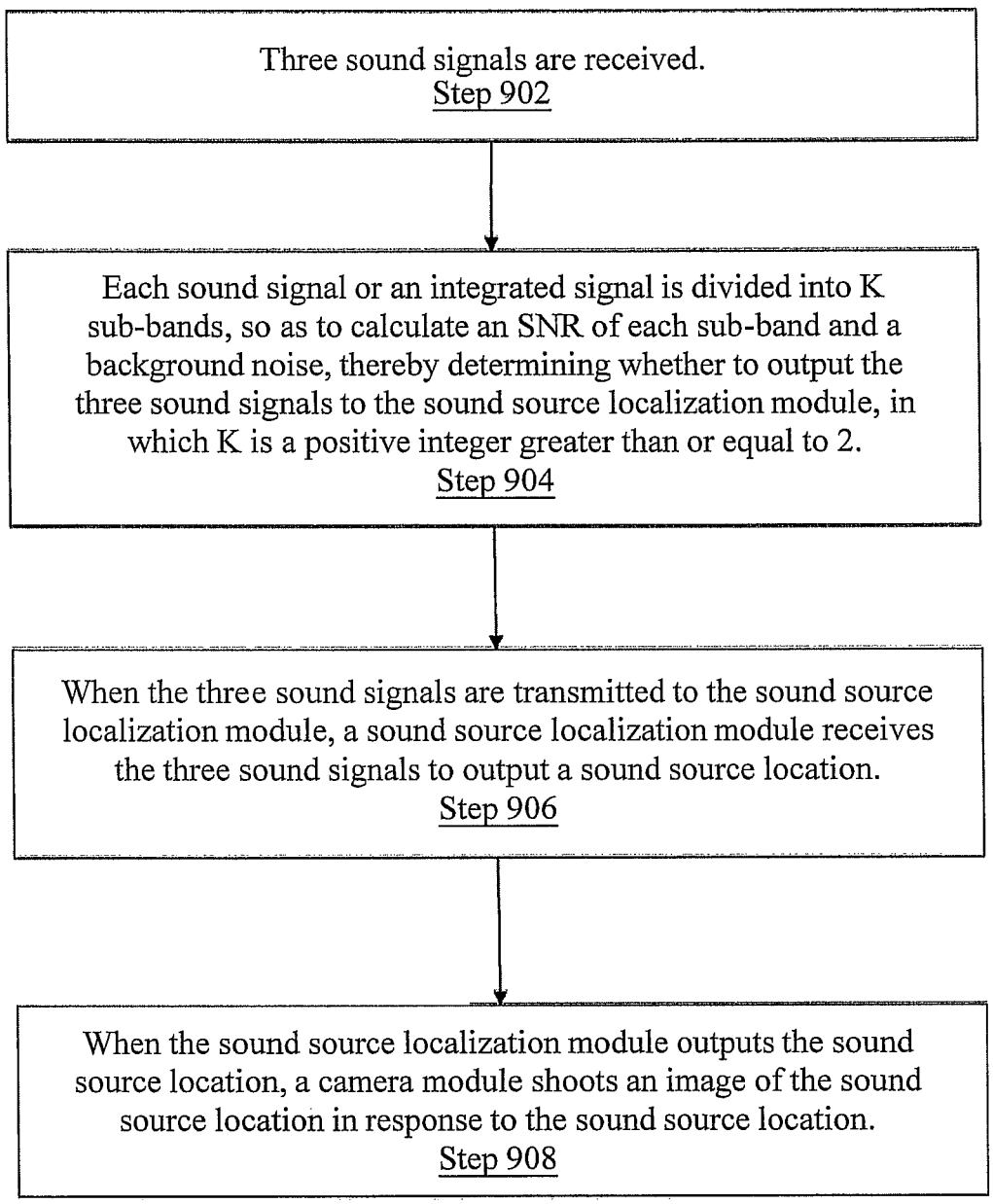
FIG. 2 is a schematic flow chart of an embodiment of the sound source monitoring method according to FIG. 1.

Referring to FIG. 1 and FIG. 2, FIG. 2 is a schematic flow chart of an embodiment of a sound source monitoring method according to FIG. 1. The sound source monitoring method comprises the following steps.

In Step 902, three sound signals are received.

In Step 904, each sound signal or an integrated signal is divided into K sub-bands to calculate the signal-to-noise ratio (SNR) of each sub-band and a background noise, and then whether to output the three sound signals to the sound source localization module is determined based on the SNRs, in which K is a positive integer greater than or equal to 2.

In Step 906, when the three sound signals are transmitted to the sound source localization module, a sound source localization module outputs a sound source location according to the three sound signals.

In Step 908, when the sound source localization module outputs the sound source location, a camera module shoots an image of the sound source location in response to the sound source location.

In Step 902, the sound source monitoring system 100 receives the sound signals Sa, Sb, Sc via the sound receiving units 50a, 50b, 50c. The sound receiving units 50a, 50b, 50c are disposed at different positions in the same monitoring space (not shown). Any two of the sound receiving units 50a, 50b, 50c are spaced by a distance so the sound signals Sa, Sb, Sc received by the sound receiving units 50a, 50b, 50c are different.

In this embodiment, the sound source monitoring system 100 uses a sound detection module 104 to divide an integrated signal Is or each sound signal (that is, the sound signal Sa, Sb, Sc) into three sub-bands so as to calculate the SNR of each sub-band and the corresponding background noise. Then, whether to output the sound signals Sa, Sb, Sc received by the sound receiving module 102 is determined based on the SNRs (that is, Step 904). In this and some embodiments, the integrated signal Is is a signal formed by first adding the sound signals Sb, Sc to the sound signal Sa and then normalizing the sum of the sound signals Sa, Sb, Sc received by the sound receiving module 108. In this and some embodiments, the background noises are obtained from historical signals received by the sound receiving units 50a, 50b, 50c monitoring the monitoring space in a long period. More specifically, the sound receiving units 50a, 50b, 50c receive the sound signals Sa, Sb, Sc in the monitoring space for a long time so a certain amount of the historical sound signals Sa, Sb, Sc received by the sound receiving units 50a, 50b, 50c are stored in the sound source monitoring system 100 and used to establish the background noises of the sound receiving units 50a, 50b, 50c in the monitoring space.

In this embodiment, the sound detection module 104 divides the integrated signal Is or each sound signal (that is, the sound signal Sa, Sb, Sc) into three sub-bands, but the disclosure is not limited thereto. For example, the sound detection module 104 may also divide the integrated signal Is or each sound signal (that is, the sound signal Sa, Sb, Sc) into five sub-bands, and the number of the sub-bands obtained after the sound detection module 104 divides the integrated signal Is or each sound signal may be adjusted according to actual requirement. When the sound detection module 104 divides the integrated signal Is or each sound signal into sub-bands of a larger number, it is much easier to define the frequency change property of the integrated signal Is or each sound signal (that is, the sound signal Sa, Sb, Sc), so that the sound detection module 104 is capable of judging whether a sound source V exists more accurately. The following embodiment is described by taking the sound detection module 104 dividing the integrated signal Is or each sound signal (that is, the sound signal Sa, Sb, Sc) into three sub-bands as an example, however, the disclosure is not limited thereto.

Figure 3:
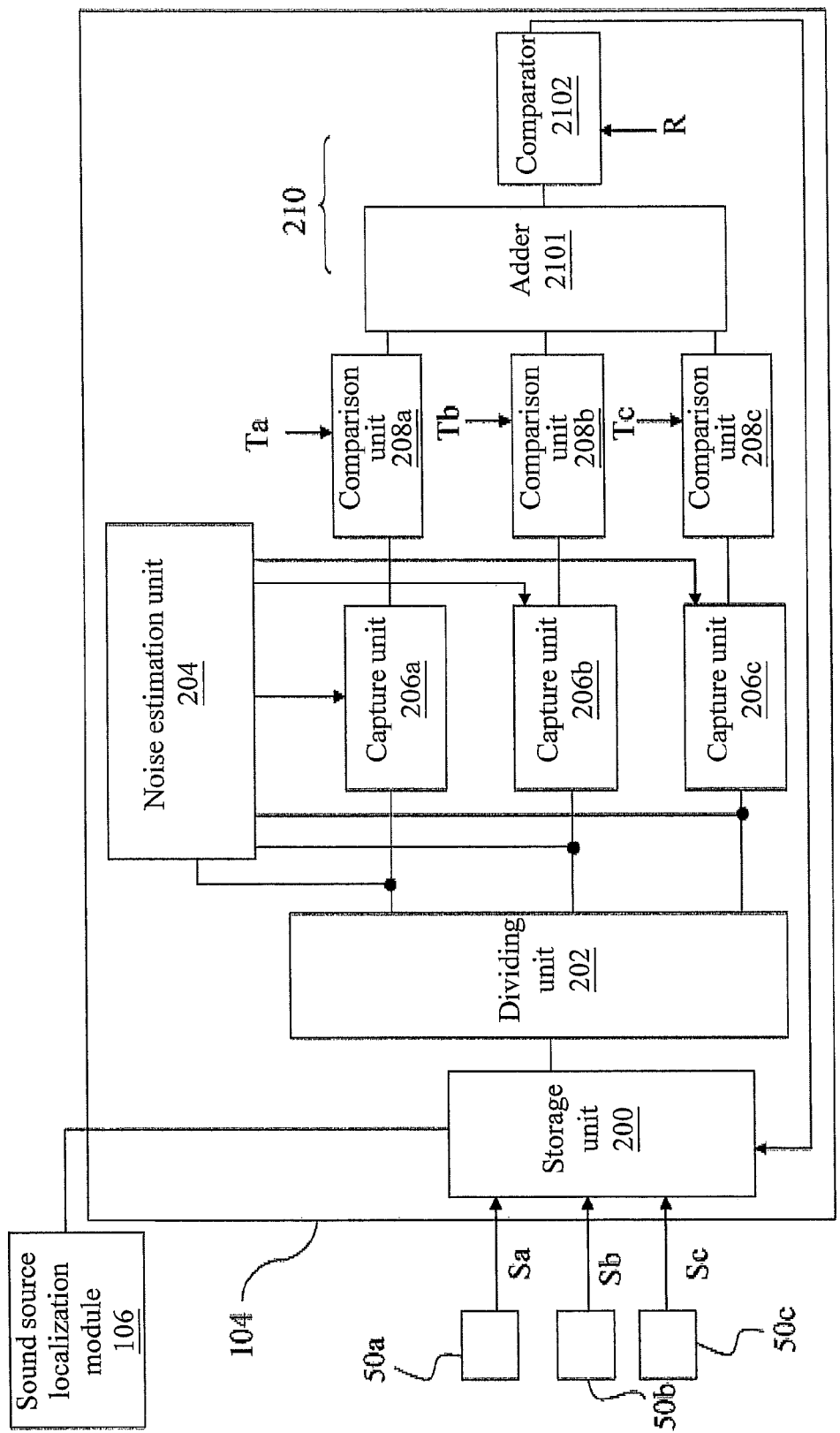
FIG. 3 is a schematic block diagram of a first embodiment of the sound detection module according to FIG. 1.

Referring to FIG. 3, a schematic block diagram of a first embodiment of a sound detection module according to FIG. 1 is shown. In this embodiment, the sound detection module 104 may comprise a storage unit 200, a dividing unit 202, a noise estimation unit 204, capture units 206a, 206b, 206c, comparison units 208a, 208b, 208c, and a judging unit 210. The number of the capture units is equal to the number of the sub-bands, and the number of the comparison units is also equal to the number of the sub-bands. In this embodiment, the number of the sub-bands is three so the number of the capture units and the number of the comparison units are all three.

In this embodiment, the storage unit 200 is coupled to the sound receiving units 50a, 50b, 50c, the dividing unit 202 is coupled to the storage unit 200, the noise estimation unit 204 is coupled to the dividing unit 202, each capture unit (that is, the capture unit 206a, 206b, 206c) is coupled to the noise estimation unit 204 and the dividing unit 202, each comparison unit is coupled to one of the three capture units 206 (that is, the comparison unit 208a is coupled to the capture unit 206a, the comparison unit 208b is coupled to the capture unit 206b, and the comparison unit 208c is coupled to the capture unit 206c), and the judging unit 210 is coupled to the comparison units 208a, 208b, 208c.

Figure 4:
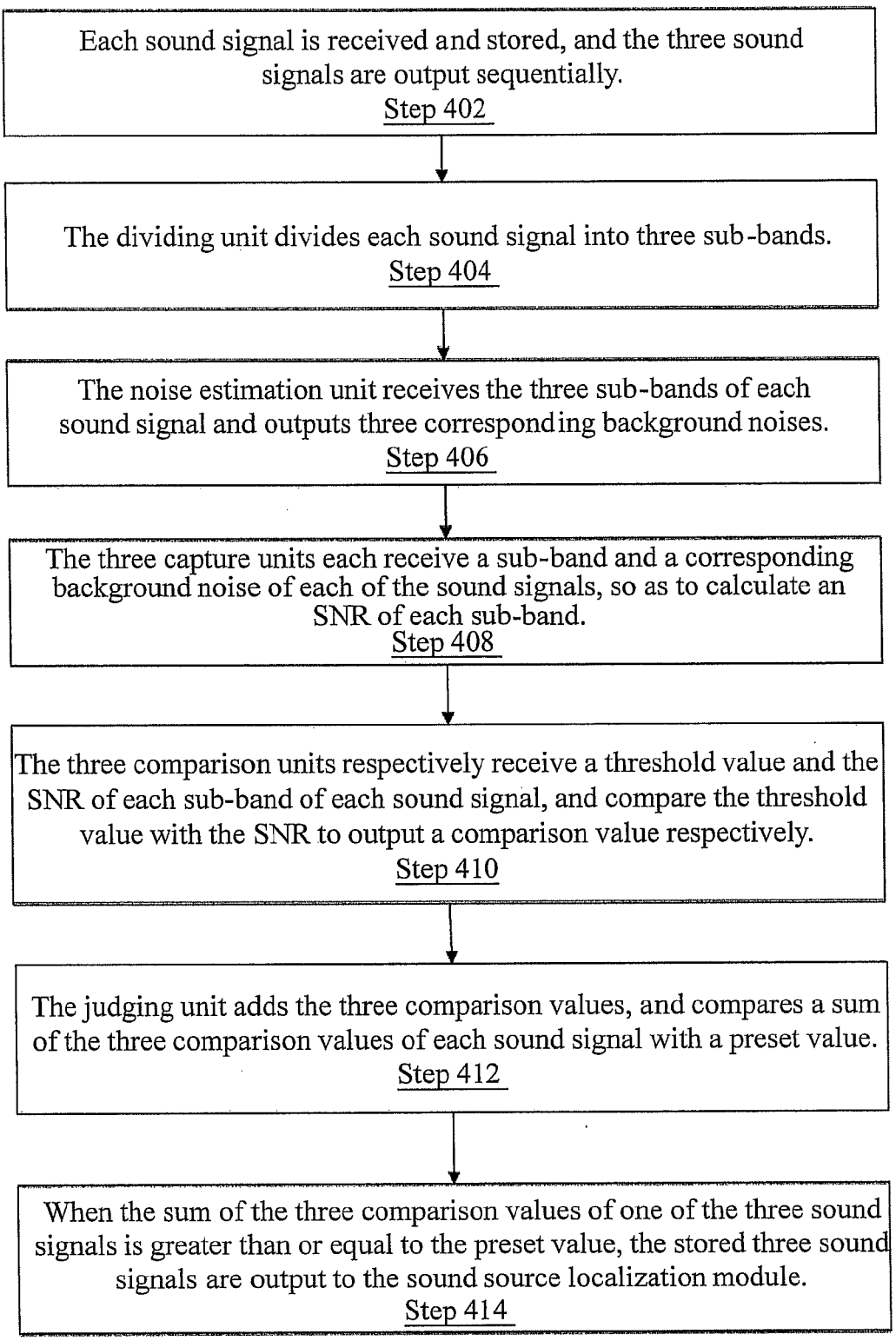
FIG. 4 is a schematic flow chart of an embodiment in which the sound detection module according to FIG. 3 performs Step 904 in FIG. 2.

Referring to FIG. 3 and FIG. 4, FIG. 4 is a schematic flow chart of an embodiment in which the sound detection module in FIG. 3 performs Step 904 in FIG. 2. In this embodiment, Step 904 further comprises the following steps.

In Step 402, each sound signal is received and stored, and the three sound signals are output sequentially.

In Step 404, the dividing unit divides each sound signal into three sub-bands.

In Step 406, the noise estimation unit receives the three sub-bands of each sound signal and outputs three corresponding background noises.

In Step 408, each of the three capture units receives a sub-band and a corresponding background noise of each of the sub-bands so as to calculate an SNR of each sub-band.

In Step 410, each of the three comparison units receives a threshold value and the SNR of one of the sub-bands of each sound signal, and compares the threshold value with the SNR to output a comparison value.

In Step 412, the judging unit adds the three comparison values, and compares the sum of the three comparison values of each sound signal with a preset value.

In Step 414, when the sum of the three comparison values of one of the three sound signals is greater than or equal to the preset value, the stored three sound signals are output to the sound source localization module.

In this embodiment, the storage unit 200 may store and output the sound signals Sa, Sb, Sc sequentially (that is, Step 402), but the disclosure is not limited thereto. For example, the storage unit 200 may store and sequentially output the sound signals Sb, Sa, Sc or sound signals Sb, Sc, Sa. It should be noted that, a time difference of the storage unit 200 outputting two adjacent sound signals is the time for the sound detection module 104 to perform Step 404 to Step 414 by using a single sound signal.

In this embodiment, the storage unit 200 stores and outputs the sound signals Sa, Sb, Sc sequentially so the dividing unit 202 divide the sound signals Sa, Sb, Sc into sub-bands $S_1$, $S_2$, $S_3$, $S_4$, $S_5$, $S_6$, $S_7$, $S_8$, $S_9$ according to the outputting order of the sound signals Sa, Sb, Sc outputted from the storage unit 200. The sound signal Sa is divided by the dividing unit 202 into the sub-bands $S_1$, $S_2$, $S_3$, the sound signal Sb is divided by the dividing unit 202 into the sub-bands $S_4$, $S_5$, $S_6$, and the sound signal Sc is divided by the dividing unit 202 into the sub-bands $S_7$, $S_8$, $S_9$ (that is, Step 404).

In Step 406, when the noise estimation unit 204 receives the sub-bands $S_1$, $S_2$, $S_3$, the noise estimation unit 204 outputs corresponding background noises $N_1$, $N_2$, $N_3$ according to the sub-bands $S_1$, $S_2$, $S_3$. When the noise estimation unit 204 receives the sub-bands $S_4$, $S_5$, $S_6$, the noise estimation unit 204 outputs corresponding background noises $N_4$, $N_5$, $N_6$ according to the sub-bands $S_4$, $S_5$, $S_6$. When the noise estimation unit 204 receives the sub-bands $S_7$, $S_8$, $S_9$, the noise estimation unit 204 outputs corresponding background noises $N_7$, $N_8$, $N_9$ according to the sub-bands $S_7$, $S_8$, $S_9$. The sound receiving units 50a, 50b, 50c are disposed at different places of the monitoring space, so the background noises $N_1$, $N_2$, $N_3$ corresponding to the sub-bands $S_1$, $S_2$, $S_3$, the background noises $N_4$, $N_5$, $N_6$ corresponding to the sub-bands $S_4$, $S_5$, $S_6$, and the background noises $N_7$, $N_8$, $N_9$ corresponding to the sub-bands $S_7$, $S_8$, $S_9$ are all different.

In Step 408, when the capture units 206a, 206b, 206c respectively receive the sub-bands $S_1$, $S_2$, $S_3$ and the corresponding background noises $N_1$, $N_2$, $N_3$, the capture units 206a, 206b, 206c respectively calculate signal-to-noise ratios $SNR_1$, $SNR_2$, and $SNR_3$. When the capture units 206a, 206b, 206c respectively receive the sub-bands $S_4$, $S_5$, $S_6$ and the corresponding background noises $N_4$, $N_5$, $N_6$, the capture units 206a, 206b, 206c respectively calculate signal-to-noise ratios $SNR_4$, $SNR_5$, and $SNR_6$. When the capture units 206a, 206b, 206c respectively receive the sub-bands $S_7$, $S_8$, $S_9$ and the corresponding background noises $N_7$, $N_8$, $N_9$, the capture units 206a, 206b, 206c respectively calculate signal-to-noise ratios $SNR_7$, $SNR_8$, $SNR_9$.

In Step 410, when the comparison units 208a, 208b, 208c respectively receive threshold values Ta, Tb, Tc and signal-to-noise ratios $SNR_1$, $SNR_2$, $SNR_3$, the comparison units 208a, 208b, 208c compare the threshold values Ta, Tb, Tc with the signal-to-noise ratios $SNR_1$, $SNR_2$, $SNR_3$, so as to output comparison values $C_1$, $C_2$, $C_3$ (that is, the comparison unit 208a compares the threshold values Ta with the signal-to-noise ratio $SNR_1$, the comparison unit 208b compares the threshold values Tb with the signal-to-noise ratio $SNR_2$, and the comparison unit 208c compares the threshold values Tc with the signal-to-noise ratio $SNR_3$). When the comparison units 208a, 208b, 208c respectively receive the threshold values Ta, Tb, Tc and the signal-to-noise ratios $SNR_4$, $SNR_5$, $SNR_6$, the comparison units 208a, 208b, 208c compare the threshold values Ta, Tb, Tc with the signal-to-noise ratios $SNR_4$, $SNR_5$, $SNR_6$, so as to output comparison values $C_4$, $C_5$, $C_6$ (that is, the comparison unit 208a compares the threshold values $T_a$ with the signal-to-noise ratio $SNR_4$, the comparison unit 208b compares the threshold values Tb with the signal-to-noise ratio $SNR_5$, and the comparison unit 208c compares the threshold values Tc with the signal-to-noise ratio $SNR_6$). When the comparison units 208a, 208b, 208c respectively receive the threshold values Ta, Tb, Tc and the signal-to-noise ratios $SNR_7$, $SNR_8$, $SNR_9$, the comparison units 208a, 208b, 208c compare the threshold values Ta, Tb, Tc with the signal-to-noise ratios $SNR_7$, $SNR_8$, $SNR_9$, so as to output comparison values $C_7$, $C_8$, $C_9$ (that is, the comparison unit 208a compares the threshold values $T_a$ with the signal-to-noise ratio $SNR_7$, the comparison unit 208b compares the threshold values Tb with the signal-to-noise ratio $SNR_8$, and the comparison unit 208c compares the threshold values Tc with the signal-to-noise ratio $SNR_9$). The threshold values Ta, Tb, Tc may be fixed values or variables, which may be adjusted according to actual requirements.

In addition, the comparison values $C_1$, $C_2$, $C_3$, $C_4$, $C_5$, $C_6$, $C_7$, $C_8$, $C_9$ may be 0 or 1. In this an some embodiments, when the signal-to-noise ratio $SNR_1$ received by the comparison unit 208a is greater than or equal to the threshold values Ta, the comparison value $C_1$ the comparison unit 208a is 1; when the signal-to-noise ratio $SNR_T$ received by the comparison unit 208a is smaller than the threshold values Ta, the comparison value $C_1$ outputted by the comparison unit 208a is 0. However, the disclosure is not limited thereto.

In Step 412, the judging unit 210 may comprise, but not limited to, an adder 2101 and a comparator 2102. The adder 2101 adds the comparison values $C_1$, $C_2$, $C_3$ and compares the sum with a preset value R. The adder 2101 adds the comparison values $C_4$, $C_5$, $C_6$ and compares the sum with the preset value R. The adder 2101 adds the comparison values $C_7$, $C_8$, $C_9$ and compares the sum with the preset value R. In this embodiment, the adder 2101 outputs at most three values, so the preset value R may be a positive integer smaller than or equal to three, and the actual magnitude of the preset value R may be adjusted according to actual requirements.

In Step 414, when the sum of the comparison values $C_1$, $C_2$, $C_3$ is greater than or equal to the preset value R, the sound detection module 104 outputs the sound signals Sa, Sb, Sc stored in the storage unit 200 to the sound source localization module 106. When the sum of the comparison values $C_4$, $C_5$, $C_6$ is greater than or equal to the preset value R, the sound detection module 104 outputs the sound signals Sa, Sb, Sc stored in the storage unit 200 to the sound source localization module 106. When the sum of the comparison values $C_7$, $C_8$, $C_9$ is greater than or equal to the preset value R, the sound detection module 104 outputs the sound signals Sa, Sb, Sc stored in the storage unit 200 to the sound source localization module 106.

More specifically, the storage unit 200 sequentially outputs the sound signals Sa, Sb, Sc so in this embodiment, the sound detection module 104 first receives the sub-bands $S_1$, $S_2$, $S_3$ to perform Step 406 to Step 414. When the sum of the comparison values $C_1$, $C_2$, $C_3$ is smaller than the preset value R, the sound detection module 104 then receives the sub-bands $S_4$, $S_5$, $S_6$ to perform Step 406 to Step 414. When the sum of the comparison values $C_4$, $C_5$, $C_6$ is smaller than the preset value R, the sound detection module 104 further receives the sub-bands $S_7$, $S_8$, $S_9$ to perform Step 406 to Step 414. When the sum of the comparison values $C_7$, $C_8$, $C_9$ is smaller than the preset value R, the sound detection module 104 determines that the sound source V does not exist, and thus does not output the sound signals Sa, Sb, Sc stored in the storage unit 200 to the sound source localization module 106. Therefore, the sound detection module 104 may determine whether to output the sound signals Sa, Sb, Sc received by the sound receiving module 102 to the sound source localization module 106 through Step 402 to Step 414.

Figure 5:
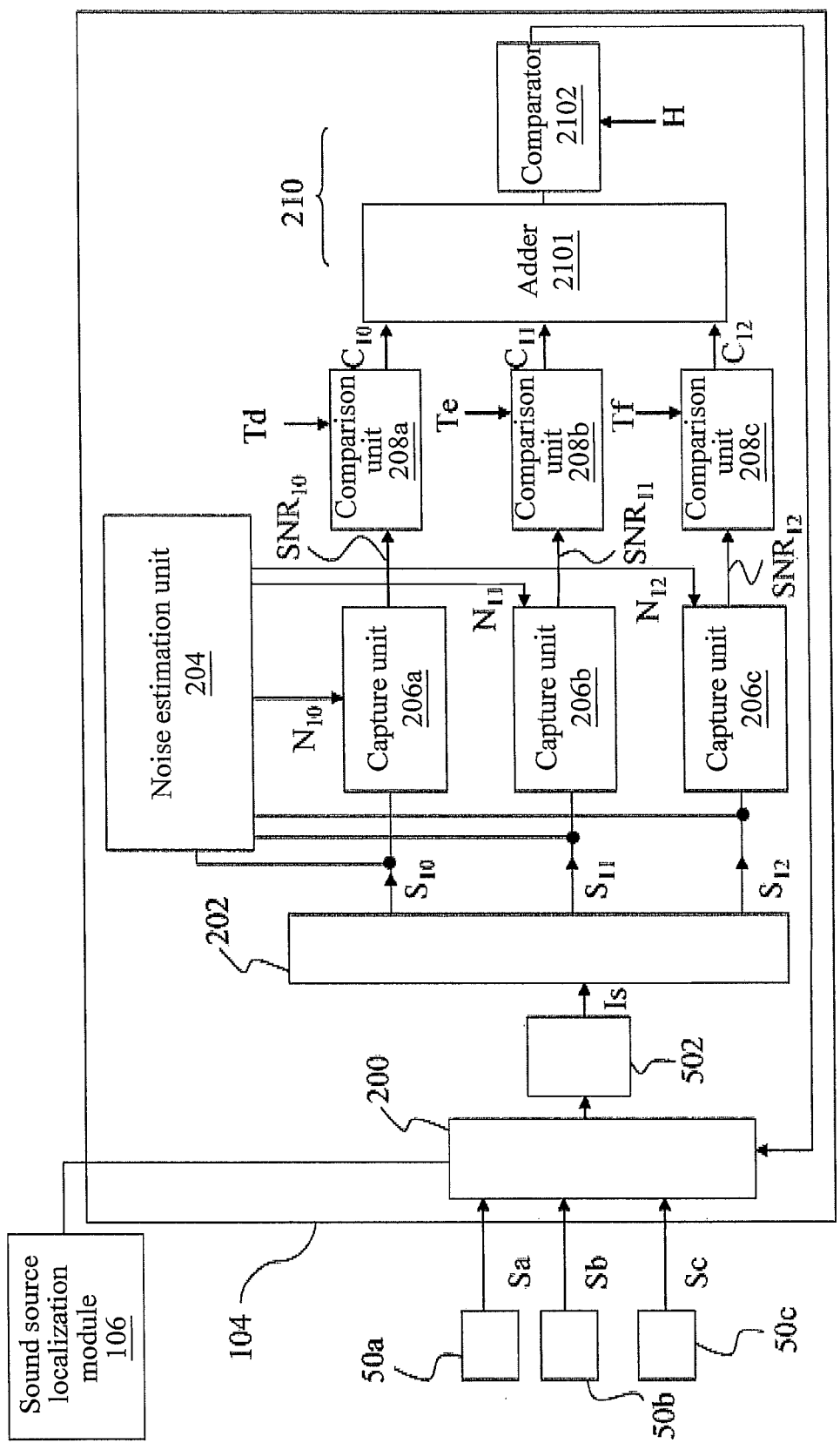
FIG. 5 is a schematic block diagram of a second embodiment of the sound detection module according to FIG. 1.

In the above embodiment, the storage unit 200 sequentially outputs the sound signals Sa, Sb, Sc so that Step 402 to Step 414 are performed by the sound detection module 104 for at most three times for determining whether the sound source V exists and judging whether to output the sound signals Sa, Sb, Sc stored in the storage unit 200 to the sound source localization module 106, but the disclosure is not limited thereto. In some embodiments, the sound detection module 104 further comprises a normalizing conversion unit 502, the normalizing conversion unit 502 is configured to add the sound signals Sa, Sb, Sc and normalize the sum of the sound signals Sa, Sb, Sc to output an integrated signal Is. Accordingly, due to the integrated signal Is, Step 606 to Step 616 is performed by the sound detection module 104 only once for judging whether the sound source V exists and determining whether to output the sound signals Sa, Sb, Sc stored in the storage unit 200 to the sound source localization module 106. Detailed description is described with reference to FIG. 5 and FIG. 6. FIG. 5 is a schematic block diagram of a second embodiment of a sound detection module according to FIG. 1, and FIG. 6 is a schematic flow chart of an embodiment in which the sound detection module in FIG. 5 performs Step 904 in FIG. 2.

Referring to FIG. 5, in this embodiment, in addition to the elements in FIG. 3, the sound detection module 104 further comprises a normalizing conversion unit 502. The storage unit 200 is coupled to the sound receiving units 50a, 50b, 50c, the normalizing conversion unit 502 is coupled to the storage unit 200, the dividing unit 202 is coupled to the normalizing conversion unit 502, the noise estimation unit 204 is coupled to the dividing unit 202, each capture unit (that is, the capture unit 206a, 206b, 206c) is coupled to the noise estimation unit 204 and the dividing unit 202, each comparison unit is coupled to one of the three capture units 206 (that is, the comparison unit 208a is coupled to the capture unit 206a, the comparison unit 208b is coupled to the capture unit 206b, and the comparison unit 208c is coupled to the capture unit 206c), and the judging unit 210 is coupled to the comparison units 208a, 208b, 208c.

Figure 6:
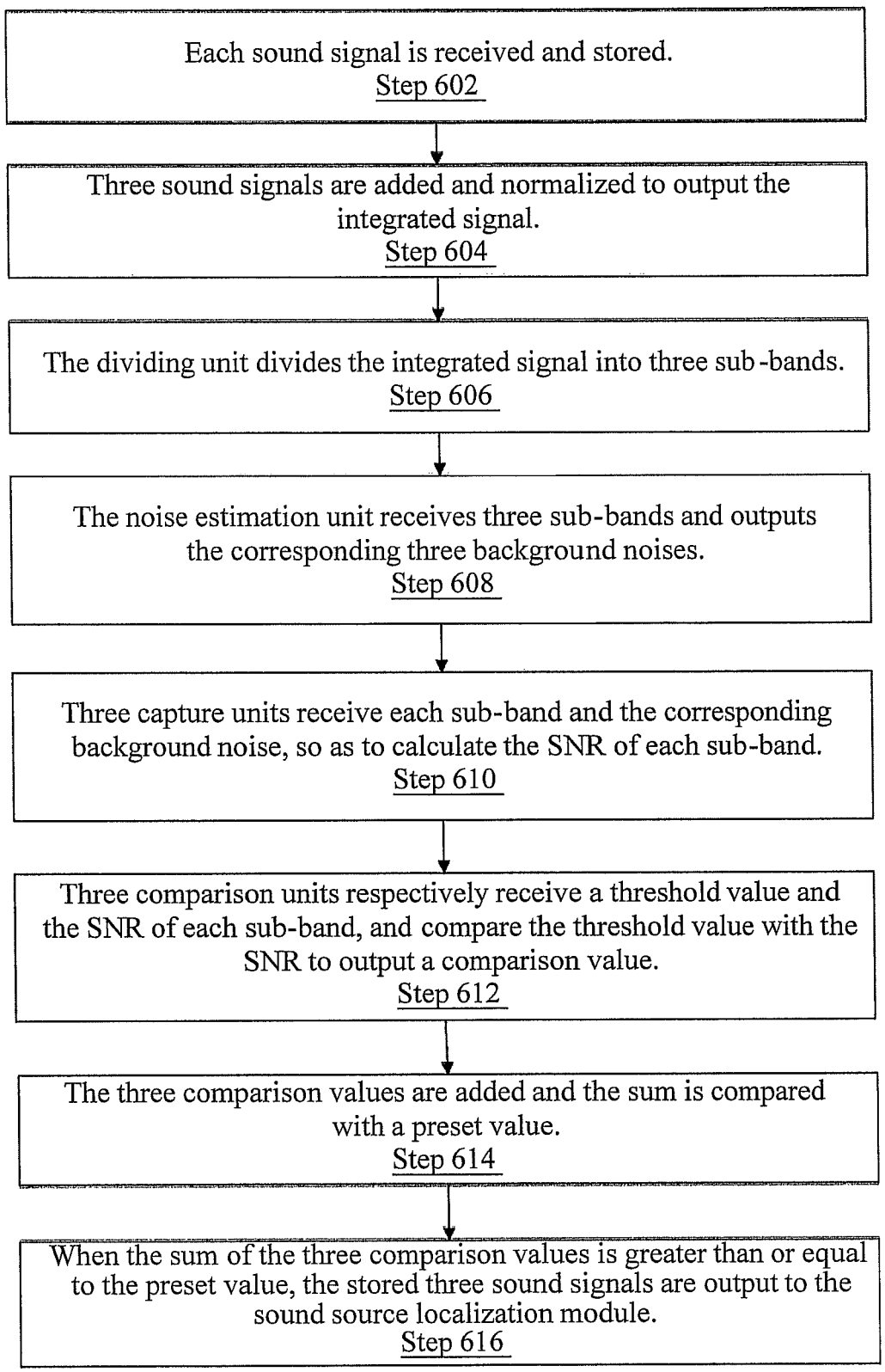
FIG. 6 is a schematic flow chart of an embodiment in which the sound detection module according to FIG. 5 perforans Step 904 in FIG. 2.

Referring to FIG. 5 and FIG. 6, in this embodiment, Step 904 further comprises the following steps.

In Step 602, each sound signal is received and stored.

In Step 604, the three sound signals are added and normalized to output the integrated signal.

In Step 606, the dividing unit divides the integrated signal into three sub-bands.

In Step 608, the noise estimation unit receives three sub-bands and outputs the corresponding three background noises.

In Step 610, three capture units receive each sub-band and the corresponding background noise, so as to calculate the SNR of each sub-band.

In Step 612, each of the three comparison units receives a threshold value and the SNR of one of the sub-bands, and compares the threshold value with the SNR to output a comparison value.

In Step 614, the three comparison values are added and the sum is compared with a preset value.

In Step 616, when the sum of the three comparison values is greater than or equal to the preset value, the stored three sound signals are output to the sound source localization module.

In this embodiment, the storage unit 200 is configured to store the sound signals Sa, Sb, Sc (that is, Step 602), and the normalizing conversion unit 502 is configured to add the sound signals Sa, Sb, Sc and normalize the sum of the sound signals Sa, Sb, Sc to output the integrated signal Is (that is, Step 604). The dividing unit 202 is configured to divide the integrated signal Is into sub-bands $S_{10}$, $S_{11}$, $S_{12}$ (that is, Step 606). The noise estimation unit 204 is configured to receive the sub-bands $S_{10}$, $S_{11}$, $S_{12}$, and output the corresponding background noises $N_{10}$, $N_{11}$, $N_{12}$ according to the sub-bands $S_{10}$, $S_{11}$, $S_{12}$ (that is, Step 608). The background noises $N_{10}$, $N_{11}$, $N_{12}$ are obtained from historical signals received by the sound receiving units 50a, 50b, 50c monitoring the space in a long time. More specifically, the sound receiving units 50a, 50b, 50c receive the sound signals Sa, Sb, Sc in the monitoring space for a long time so a certain amount of the historical sound signals Sa, Sb, Sc received by the sound receiving units 50a, 50b, 50c are added and the sum of the historical sound signals Sa, Sb, Sc are normalized to establish the background noises $N_{10}$, $N_{11}$, $N_{12}$ of the sound receiving units 50a, 50b, 50c in the monitoring space.

The capture units 206a, 206b, 206c respectively receive the sub-bands $S_{10}$, $S_{11}$, $S_{12}$ and the corresponding background noises $N_{10}$, $N_{11}$, $N_{12}$ to calculate the signal-to-noise ratios $SNR_{10}$, $SNR_{11}$, $SNR_{12}$ (that is, Step 610). The comparison units 208a, 208b, 208c respectively receive the threshold values Td, Te, Tf and the signal-to-noise ratios $SNR_{10}$, $SNR_{11}$, $SNR_{12}$, and compare the threshold values Td, Te, Tf with the signal-to-noise ratio $SNR_{10}$, $SNR_{11}$, $SNR_{12}$ to output comparison values $C_{10}$, $C_{11}$, $C_{12}$ (that is, Step 612). In this embodiment, the comparison values $C_{10}$, $C_{11}$, $C_{12}$ may be 0 or 1. When the signal-to-noise ratio $SNR_{10}$ received by the comparison unit 208a is greater than or equal to the threshold value Td, the comparison value $C_{10}$ outputted by the comparison unit 208a is 1; when the signal-to-noise ratio $SNR_{10}$ received by the comparison unit 208a is smaller than the threshold value Td, the comparison value $C_{10}$ outputted by the comparison unit 208a is 0, but the disclosure is not limited thereto.

In this embodiment and some embodiments, the judging unit 210 comprises an adder 2101 and a comparator 2102. The adder 2101 adds the comparison values $C_{10}$, $C_{11}$, $C_{12}$ and compares the sum with a preset value H (that is, Step 614). When the sum of the comparison values $C_{10}$, $C_{11}$, $C_{12}$ is greater than or equal to the preset value H, the sound signals Sa, Sb, Sc stored in the storage unit 200 are output to the sound source localization module 106 (that is, Step 616). When the sum of the comparison values $C_{10}$, $C_{11}$, $C_{12}$ is smaller than the preset value H, the sound detection module 104 determines that the sound source V does not exist, and thus does not output the sound signals Sa, Sb, Sc stored in the storage unit 200 to the sound source localization module 106. Therefore, the sound detection module 104 can determine whether to output the sound signals Sa, Sb, Sc received by the sound receiving module 102 to the sound source localization module 106 through Step 602 to Step 616.

Figure 7A:
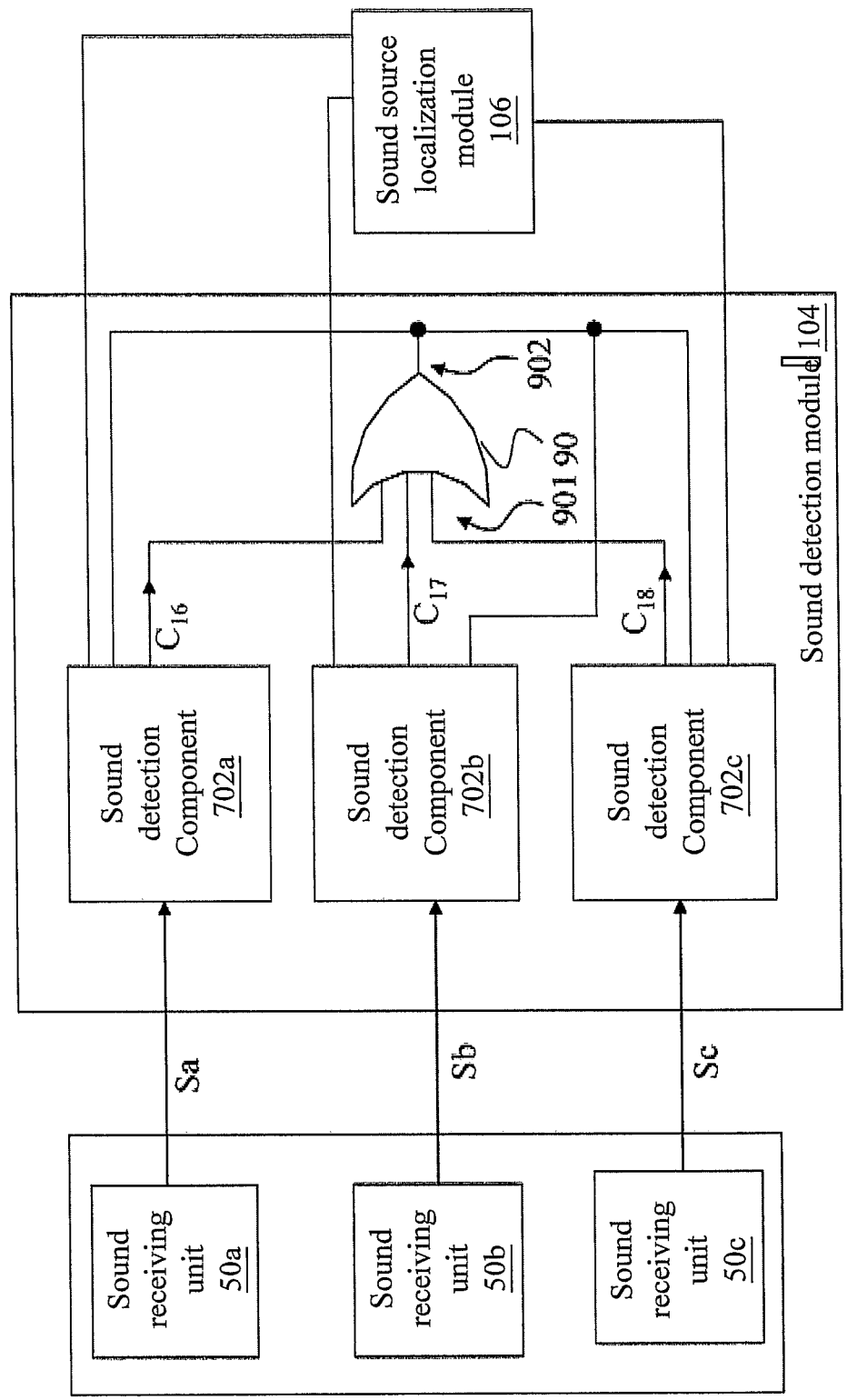
FIG. 7A is a schematic block diagram of a third embodiment of the sound detection module according to FIG. 1.

Referring to FIG. 7A, a schematic block diagram of a third embodiment of the sound detection module according to FIG. 1 is shown. In this embodiment, the sound detection module 104 may comprise, but not limited to, sound detection components 702a, 702b, 702c. The sound detection components 702a, 702b, 702c are respectively coupled to the sound receiving units 50a, 50b, 50c so as to respectively receive the sound signals Sa, Sb, Sc. In this embodiment, the number of the sound receiving units is three so the number of the sound detection components is also three.

Figure 7B:
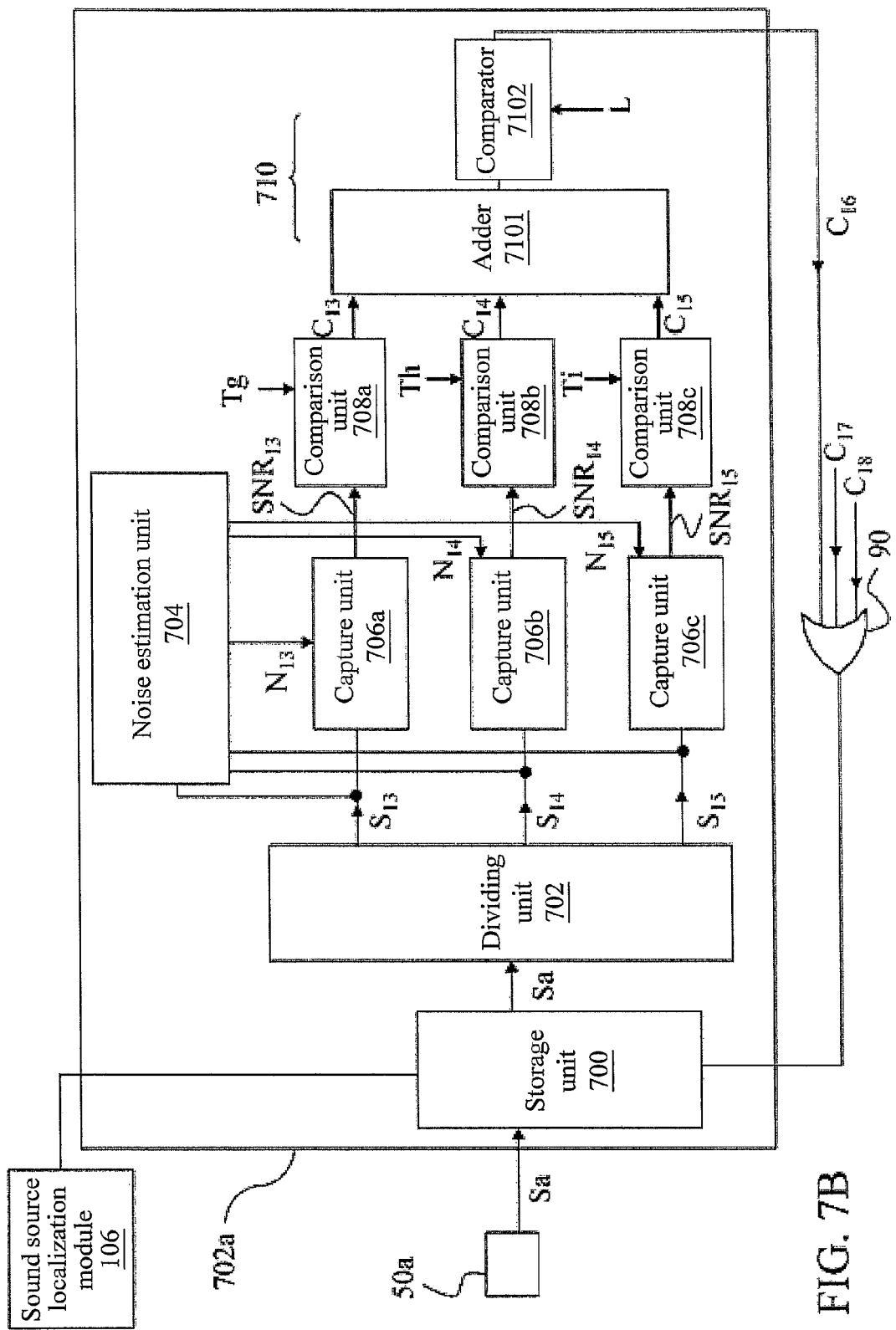
FIG. 7B is a schematic block diagram of an embodiment of a sound detection component according to FIG. 7A.

Referring to FIG. 7A and FIG. 7B, in which FIG. 7B is a schematic block diagram of an embodiment of the sound detection component according to FIG. 7A. The sound detection components 702a, 702b, 702c only differ from one another in term of the received sound signals, and the sound detection components 702a, 702b, 702c all comprise the same elements so only the sound detection component 702a is described in FIG. 7B. The sound detection component 702a comprises a storage unit 700, a dividing unit 702, a noise estimation unit 704, capture units 706a, 706b, 706c, comparison units 708a, 708b, 708c, and a judging unit 710. The number of the capture units is equal to the number of the sub-bands, and the number of the comparison units is also equal to the number of the sub-bands. In this embodiment, the number of the sub-bands is three so the number of the capture units and the number of the comparison units are all three.

In this embodiment, the storage unit 700 is coupled to the sound receiving unit 50a, the dividing unit 702 is coupled to the sound receiving unit 50a, the noise estimation unit 704 is coupled to the dividing unit 702, each capture unit (that is, the capture unit 706a, 706b, 706c) is coupled to the noise estimation unit 704 and the dividing unit 702, each comparison unit is coupled to one of the three capture units 706 (that is, the comparison unit 708a is coupled to the capture unit 706a, the comparison unit 708b is coupled to the capture unit 706b, and the comparison unit 708c is coupled to the capture unit 706c), and the judging unit 710 is coupled to the comparison units 708a, 708b, 708c.

Further, referring to FIG. 7A, the sound detection module 104 may further comprise an OR gate 90, input ends 901 of the OR gate 90 are respectively coupled to the sound detection components 702a, 702b, 702c, and an output end 902 of the OR gate 90 is respectively coupled to the storage unit 700 of the sound detection components 702a, 702b, 702c.

Figure 8:
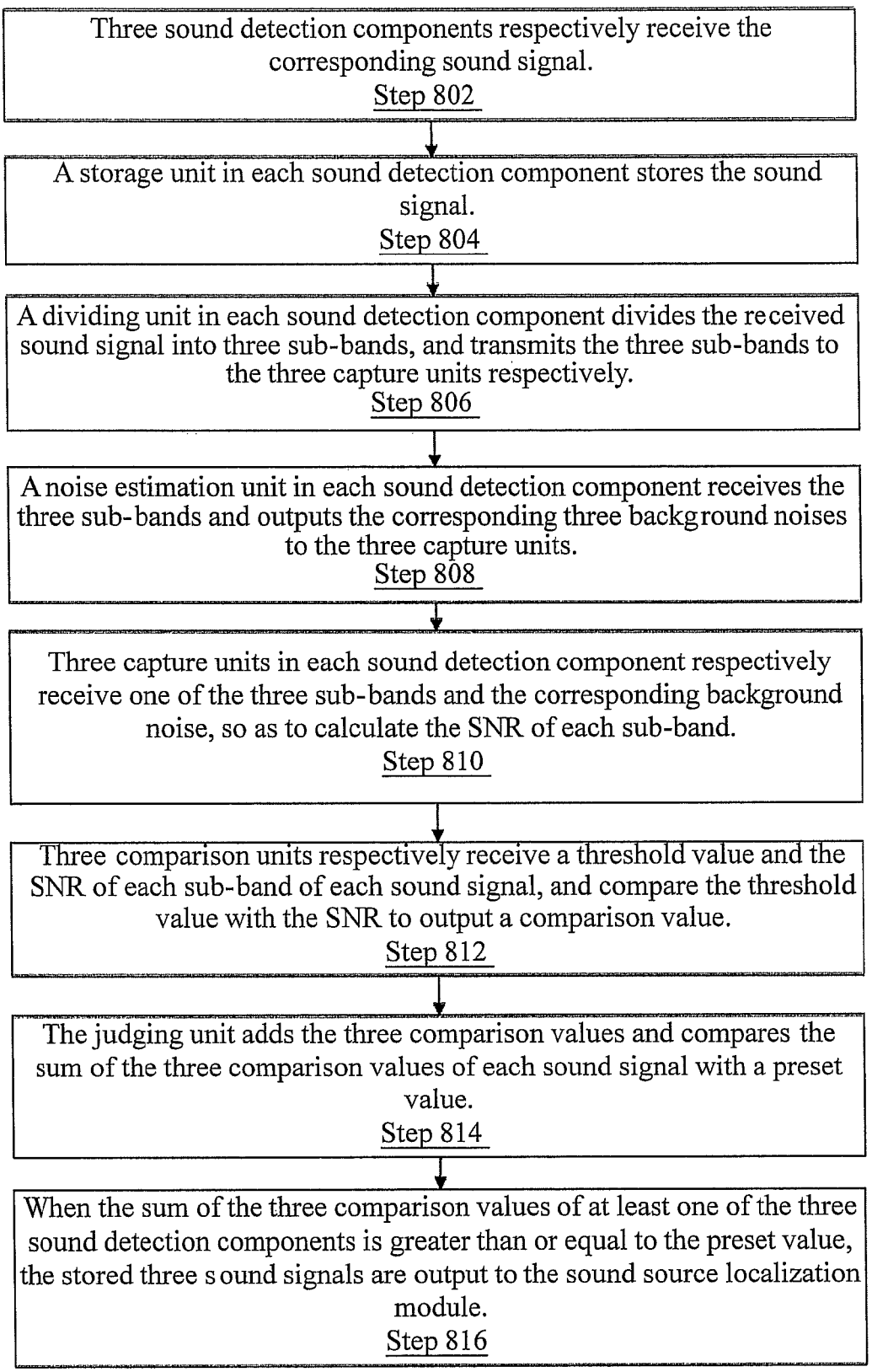
FIG. 8 is a schematic flow chart of an embodiment in which the sound detection module according to FIG. 3 performs Step 904 in FIG. 2.

Referring to FIG. 7B and FIG. 8, FIG. 8 is a schematic flow chart of an embodiment in which the sound detection module in FIG. 3 performs Step 904 in FIG. 2. In this embodiment, Step 904 further comprises the following steps.

In Step 802, three sound detection components respectively receive the corresponding sound signal.

In Step 804, a storage unit in each sound detection component stores the sound signal.

In Step 806, a dividing unit in each sound detection component divides the received sound signal into three sub-bands, and transmits the three sub-bands to the three capture units respectively.

In Step 808, a noise estimation unit in each sound detection component receives the three sub-bands and outputs the corresponding three background noises to the three capture units.

In Step 810, three capture units in each sound detection component respectively receive one of the three sub-bands and the corresponding background noise, so as to calculate the SNR of each sub-band.

In Step 812, each of the three comparison units receives a threshold value and the SNR of one of the sub-bands, and compares the threshold value with the SNR to output a comparison value.

In Step 814, the judging unit adds the three comparison values and compares the sum of the three comparison values of each sound signal with a preset value.

In Step 816, when the sum of the three comparison values of at least one of the three sound detection components is greater than or equal to the preset value, the stored three sound signals are output to the sound source localization module.

The sound detection components 702a, 702b, 702c differ from one another only in term of the received sound signals, and the sound detection components 702a, 702b, 702c all comprise the same elements, so only the sound detection component 702a is taken as an example to illustrate Step 804 to Step 814, and the situations of the sound detection components 702b, 702c performing Step 804 to Step 814 may be deduced by analog, and are not repeated herein.

In the sound detection component 702a, the storage unit 700 is configured to store the sound signal Sa (that is, Step 804), the dividing unit 702 is configured to divide the sound signal Sa received by the sound receiving unit 50a into sub-bands $S_{13}$, $S_{14}$, $S_{15}$ (that is, Step 806). The noise estimation unit 704 is configured to receive the sub-bands $S_{13}$, $S_{14}$, $S_{15}$, and output the corresponding background noises $N_{13}$, $N_{14}$, $N_{15}$ according to the sub-bands $S_{13}$, $S_{14}$, $S_{15}$ (that is, Step 808). The background noises $N_{13}$, $N_{14}$, $N_{15}$ are obtained from historical signals received by the sound receiving unit 50a monitoring the monitoring space in a long period. More specifically, the sound receiving units 50a receives the sound signals Sa in the monitoring space for a long time so a certain amount of the historical sound signals Sa received by the sound receiving unit 50a are be used to establish the background noises $N_{13}$, $N_{14}$, $N_{15}$ of the sound receiving units 50a in the monitoring space.

The capture units 706a, 706b, 706c respectively receive the sub-bands $S_{13}$, $S_{14}$, $S_{15}$ and the corresponding background noises $N_{13}$, $N_{14}$, $N_{15}$ to calculate the signal-to-noise ratios $SNR_{13}$, $SNR_{14}$, $SNR_{15}$ (that is, Step 810). The comparison units 708a, 708b, 708c respectively receive threshold values Tg, Th, Ti and the signal-to-noise ratios $SNR_{13}$, $SNR_{14}$, $SNR_{15}$, and compare the threshold values Tg, Th, Ti with the signal-to-noise ratios $SNR_{13}$, $SNR_{14}$, $SNR_{15}$ to output comparison values $C_{13}$, $C_{14}$, $C_{15}$ (that is, Step 812). In this embodiment, the comparison values $C_{13}$, $C_{14}$, $C_{15}$ may be 0 or 1. When the signal-to-noise ratio $SNR_{13}$ received by the comparison unit 708a is greater than or equal to the threshold value Tg, the comparison value $C_{13}$ outputted by the comparison unit 708a is 1; when the signal-to-noise ratio $SNR_{13}$ received by the comparison unit 708a is smaller than the threshold value Tg, the comparison value $C_{13}$ outputted by the comparison unit 708a is 0, but the disclosure is not limited thereto.

The judging unit 710 may comprise, but not limited to, an adder 7101 and a comparator 7102. The adder 7101 adds the comparison values $C_{13}$, $C_{14}$, $C_{15}$ and compares the sum with a preset value L (that is, Step 814).

In Step 816, the sound detection module 104 uses the OR gate 90 to judge whether the sum of the three comparison values of at least one of the sound detection components 702a, 702b, 702c is greater than the preset value L, thereby determining whether to output the sound signals Sa, Sb, Sc stored in the sound detection module 104 to the sound source localization module 106. More specifically, each sound detection component (that is, the sound detection component 702a, 702b, 702c) performs Step 814 and then outputs the comparison value $C_{16}$, $C_{17}$, $C_{18}$, and the comparison values $C_{16}$, $C_{17}$, $C_{18}$ each may be 0 or 1. For example, in the sound detection component 702a, when the sum of the comparison values $C_{13}$, $C_{14}$, $C_{15}$ is greater than or equal to the preset value L, the comparison value $C_{13}$ outputted by the comparator 7102 is 1; when the sum of the comparison values $C_{13}$, $C_{14}$, $C_{15}$ is smaller than the preset value L, the comparison value $C_{13}$ outputted by the comparator 7102 is 0, but the disclosure is not limited thereto.

Therefore, when the sum of the three comparison values of at least one of the sound detection components 702a, 702b, 702c is greater than or equal to the preset value L, the sound detection module 104 outputs the sound signals Sa, Sb, Sc stored in the storage unit 700 of each sound detection component (that is, the sound detection component 702a, 702b, 702c) to the sound source localization module 106. When the sums of the three comparison values of the sound detection components 702a, 702b, 702c are all smaller than the preset value L, the sound detection module 104 determines that the sound source V does not exist, and thus does not output the sound signals Sa, Sb, Sc stored in the storage unit 700 of each sound detection component (that is, the sound detection component 702a, 702b, 702c) to the sound source localization module 106. In other words, the sound detection module 104 may determine whether to output the sound signals Sa, Sb, Sc received by the sound receiving module 102 to the sound source localization module 106 through Step 802 to Step 816.

After the sound detection module 104 performs Step 904, the sound source monitoring system 100 uses the sound source localization module 106 to receive the sound signals Sa, Sb, Sc to output a sound source location P (that is, Step 906). In the above embodiment, the number of the sound source V is one, but the disclosure is not limited thereto. For example, multiple sound sources may exist in the monitoring space where the sound source monitoring system 100 locates.

Figure 9:
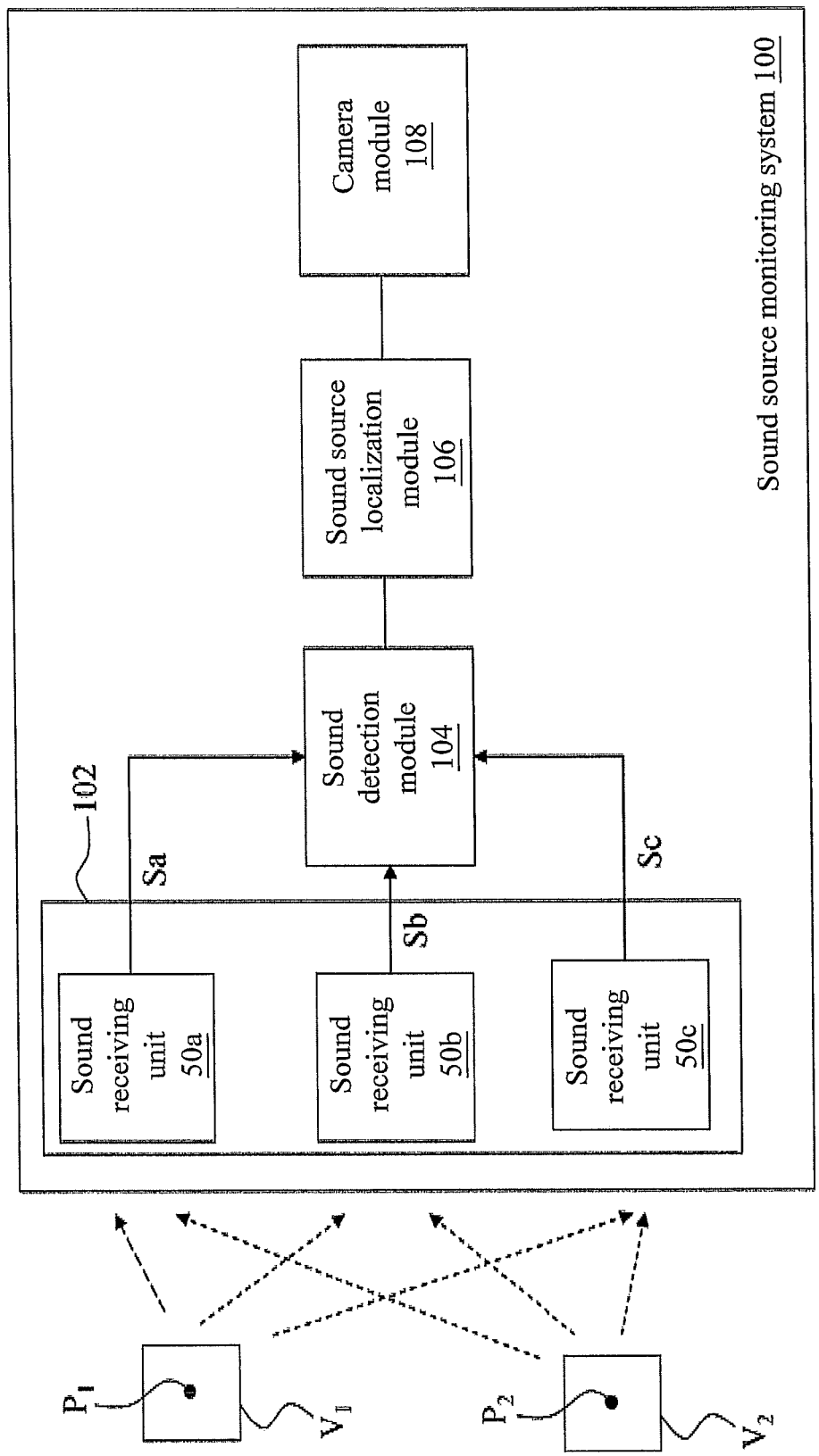
FIG. 9 is a schematic block diagram of another embodiment of a sound source monitoring system according to the disclosure.
Figure 10:
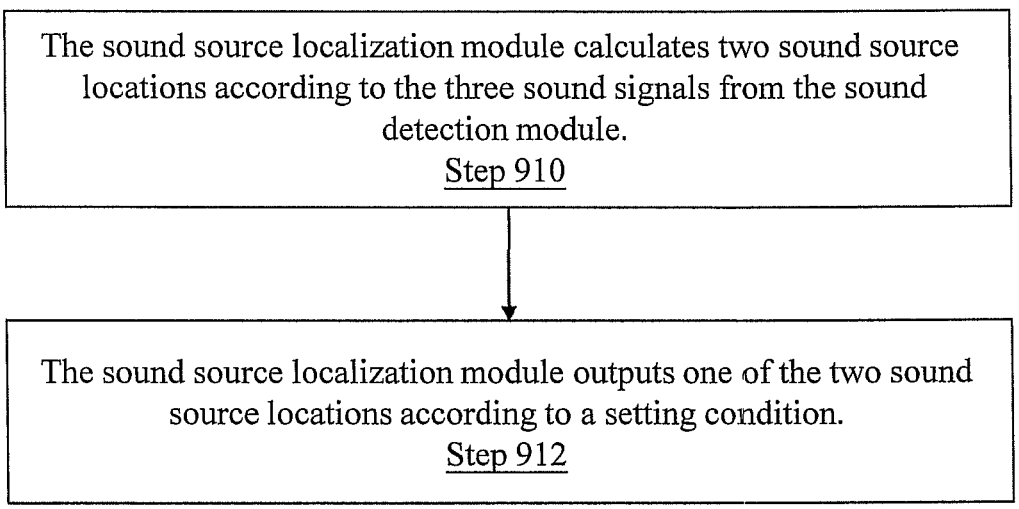
FIG. 10 is a schematic flow chart of an embodiment in which the sound source monitoring system according to FIG. 9 performs Step 906.

Referring to FIG. 9 and FIG. 10, FIG. 9 is a schematic block diagram of another embodiment of a sound source monitoring system according to the disclosure, and FIG. 10 is a schematic flow chart of an embodiment in which the sound source monitoring system according to FIG. 9 performs Step 906. In this embodiment, sound sources $V_1$, $V_2$ exist in the monitored space where the sound source monitoring system 100 locates, the sound sources $V_1$, $V_2$ are sources emitting sound signals when a special event occurs (dashed line in FIG. 9).

The sound source localization module 106 can only output a single sound source location (that is, the sound source location $P_1$ or the sound source location $P_2$) to the camera module 108 at one time so the camera module 108 shoots an image corresponding to the sound source location (that is, the sound source location $P_1$ or the sound source location $P_2$) in response to the sound source location (that is, Step 908), and therefore, in this embodiment, Step 906 may further comprise the following steps.

In Step 910, the sound source localization module calculates two sound source locations according to the three sound signals from the sound detection module.

In Step 912, the sound source localization module outputs one of the two sound source locations according to a setting condition.

The setting condition in Step 912 may be, but is not limited to, a sound source having the largest volume in the monitoring space, or any condition set by the user. Therefore, according to the setting condition, the sound source localization module 106 may select the sound source location (that is, the sound source location $P_1$ or the sound source location $P_2$) conforming to the setting condition for the camera module 108.

The sound source monitoring system and the method thereof according to the disclosure is applicable to security systems, robot industries, or communication industries. The sound detection module calculates the SNRs of sub-bands, so as to judge whether a sound source exists in the monitored space where the sound source monitoring system locates. When the sound detection module judges that a sound source exists in the monitored space, the sound source localization module outputs the location of the sound source according to sound signals received by the sound receiving module, and then the camera module shoots an image corresponding to the sound source. The sound source is a source emitting the sound signals in the monitored space when a special event occurs. Moreover, when the monitoring space has multiple sound sources, according to a setting condition, the sound source localization module selects the sound source location conforming to the setting condition for the camera module, so that the camera module shoots an image of the sound source location output by the sound source localization in response to the sound source location. Therefore, the sound source monitoring system and the method according to the disclosure may improve the reliability of the sound localization, thereby accurately shooting the image in the monitoring space when a special event occurs.

What is claimed is:

1. A sound source monitoring system, comprising:
   a sound receiving module, comprising a plurality of sound receiving units, and each of the sound receiving units configured to receive a sound signal;
   a sound detection module, comprising:
      a storage unit, coupled to the sound receiving units and configured to receive and store each of the sound signals, and to output the sound signals sequentially;
      a dividing unit, coupled to the storage unit and configured to divide an integrated signal or each of the sound signals into K sub-bands, wherein K is a positive integer greater than or equal to 2, and the integrated signal is a normalized sum of the sound signals;
      a noise estimation unit, coupled to the dividing unit and configured to receive the K sub-bands of each of the sound signals and output the corresponding K background noises;
      K capture units, coupled to the noise estimation unit and the dividing unit, and configured to receive each of the sub-bands and each corresponding background noise of each of the sub-bands for calculating the SNR of each of the sub-bands;
      K comparison units, coupled to the K capture units and each of the comparison units configured to receive a threshold value and the SNR of one of the sub-bands of each of the sound signals, and compare the threshold value with the SNR to output a comparison value; and
      a judging unit, coupled to the K comparison units, and configured to add the K comparison values in each of the sound signals and compare a sum of the K comparison values in each of the sound signals with a preset value, the sound detection module configured to output the sound signals stored in the storage unit when the sum of the K comparison values of one of the sound signals is greater than or equal to the preset value;
   a sound source localization module configured to receive the sound signals from the sound detection module to output a sound source location; and
   a camera module configured to shoot an image corresponding to the sound source location in response to the sound source location.

2. The sound source monitoring system according to claim 1, wherein the sound detection module comprises:
   a storage unit, coupled to the sound receiving units and configured to receive and store each of the sound signals;
   a normalizing conversion unit, coupled to the storage unit and configured to add the sound signals and normalize the sum of the sound signals to output the integrated signal;
   a dividing unit coupled to the normalizing conversion unit and configured to divide the integrated signal into the K sub-bands;

a noise estimation unit, coupled to the dividing unit and configured to receive the K sub-bands and output the corresponding K background noises;

K capture units, coupled to the noise estimation unit and the dividing unit, and configured to receive each of the sub-bands and each corresponding background noise to calculate the SNR of each of the sub-bands;

K comparison units, coupled to the K capture units, and each of the comparison units configured to receive a threshold value and the SNR of one of the sub-bands, and compare the threshold value with the SNR to output a comparison value; and a judging unit, coupled to the K comparison units, and configured to add the K comparison values and compare a sum of the K comparison values with a preset value, the sound detection module configured to output the sound signals stored in the storage unit to the sound source localization module when the sum of the K comparison values is greater than or equal to the preset value.

3. The sound source monitoring system according to claim 1, wherein the sound detection module comprises a plurality of sound detection components, each of the sound detection components comprises:

a storage unit, coupled to one of the sound receiving units, and configured to receive and store one of the sound signals;

a dividing unit, coupled to the sound receiving unit coupled to the storage unit, and configured to divide the sound signal received by the sound receiving unit into the K sub-bands;

a noise estimation unit, coupled to the dividing unit, and configured to receive the K sub-bands and output the corresponding K background noises;

K capture units, coupled to the dividing unit and the noise estimation unit, and configured to respectively receive one of the K sub-bands and each corresponding background noise to calculate the SNR of each of the sub-bands;

K comparison units, coupled to the K capture units, and each of the comparison units configured to receive a threshold value and the SNR of one of the sub-bands, and compare the threshold value with the SNR to output a comparison value; and a judging unit, coupled to the K comparison units, and configured to add the K comparison values and compare a sum of the K comparison values with a preset value, the sound detection module configured to output the sound signals stored in the storage units to the sound source localization module when the sum of the K comparison values of at least one of the sound detection components is greater than or equal to the preset value.

4. The sound source monitoring system according to claim 3, wherein the sound detection module further comprises an OR gate, an output end of each of the sound detection components is coupled to at least one of input ends of the OR gate, and an output end of the OR gate is coupled to the storage units and configured to control the sound detection module to whether output the sound signals to the sound source localization module.

5. The sound source monitoring system according to claim 1, wherein the sound source localization module is configured to calculate a plurality of sound source locations according to the sound signals from the sound detection module, and output one of the sound source locations to the camera module according to a setting condition for making the camera module shoot the image corresponding to the sound source location in response to the sound source location output by the sound source localization module.

6. A sound source monitoring method, comprising:
receiving a plurality of sound signals;
receiving and storing each of the sound signals, and outputting the sound signals sequentially;
dividing each of the sound signals or an integrated signal into K sub-bands by a dividing unit, wherein K is a positive integer greater than or equal to 2, and the integrated signal is formed by adding the sound signals and normalizing the sum the sound signals;
receiving the K sub-bands of each of the sound signals and outputting the corresponding K background noises by a noise estimation unit;
receiving each of the sub-bands and the corresponding background noise of each of the sound signals by K capture units for calculating the SNR of each of the sub-bands;
receiving and comparing the SNRs of the sub-bands with threshold values respectively by K comparison units for outputting comparison values;
adding the K comparison values and comparing a sum of the K comparison values of each of the sound signals with a preset value by a judging unit;
when the sum of the K comparison values of one of the sound signals is greater than or equal to the preset value, outputting the stored sound signals to a sound source localization module;
when transmitting the sound signals to the sound source localization module, using the sound source localization module to receive the sound signals to output a sound source location; and
when the sound source localization module outputs the sound source location, using a camera module to shoot an image corresponding to the sound source location in response to the sound source location.

7. The sound source monitoring method according to claim 6, wherein the step of dividing each of the sound signals or the integrated signal into the K sub-bands to calculate the SNR of each of the sub-bands and the background noise, and accordingly determine whether to output the sound signals to the sound source localization module, further comprises:
receiving and storing each of the sound signals;
adding the sound signals and normalizing the sum of the signals to output the integrated signal;
dividing the integrated signal into the K sub-bands by a dividing unit;
receiving the K sub-bands and outputting the corresponding K background noises by a noise estimation unit;
receiving each of the sub-bands and the corresponding background noise by K capture units for calculating the SNR of each of the sub-bands;
receiving and comparing the SNRs of the sub-bands with threshold values respectively by K comparison units for outputting comparison values;
adding the K comparison values and comparing a sum of the K comparison values with a preset value; and
when the sum of the K comparison values is greater than or equal to the preset value, outputting the stored sound signals to the sound source localization module.

8. The sound source monitoring method according to claim 6, wherein the step of dividing each of the sound signals or the integrated signal into the K sub-bands for calculating the SNR of each of the sub-bands and the background noise, and accordingly determining whether to output the sound signals to the sound source localization module, further comprises:

respectively receiving the corresponding sound signals by K sound detection components;

storing the sound signal by a storage unit in each of the sound detection components;

dividing the received sound signal into the K sub-bands, and respectively transmitting the K sub-bands to the K capture units by a dividing unit in each of the sound detection components;

receiving the K sub-bands and output the corresponding K background noises to the K capture unit by a noise estimation unit in each of the sound detection components;

receiving each of the K sub-bands and the corresponding background noise by the K capture units in each of the sound detection components for calculating the SNR of each of the sub-bands;

receiving and comparing the SNRs of the sub-bands of each of the sound signals with threshold values respectively K comparison units for outputting a comparison value;

adding the K comparison values and comparing a sum of the K comparison values of each of the sound signals with a preset value by a judging unit to; and when the sum of the K comparison values of at least one of the sound detection components is greater than or equal to the preset value, outputting the stored sound signals to the sound source localization module.

9. The sound source monitoring method according to claim 6, wherein the step of receiving the sound signals to output the sound source location when transmitting the sound signals to the sound source localization module, further comprises:

calculating a plurality of sound source locations according to the sound signals from the sound detection module by the sound source localization module; and outputting one of the sound source locations according to a setting condition by the sound source localization module.

* * * * *